(12) United States Patent
Crawley et al.

(10) Patent No.: US 7,500,118 B2
(45) Date of Patent: Mar. 3, 2009

(54) NETWORK DEVICE WITH POWER POTENTIAL RECTIFIER

(75) Inventors: Philip John Crawley, Folsom, CA (US); John R. Camagna, El Dorado Hills, CA (US)

(73) Assignee: Akros Silicon Inc., Folsom, CA (US)

(*) Notice: Subject to any disclaimer, the term of this patent is extended or adjusted under 35 U.S.C. 154(b) by 467 days.

(21) Appl. No.: 11/284,998

(22) Filed: Nov. 21, 2005

(65) Prior Publication Data

US 2006/0238252 A1 Oct. 26, 2006

Related U.S. Application Data

(63) Continuation-in-part of application No. 11/207,602, filed on Aug. 19, 2005, and a continuation-in-part of application No. 11/207,595, filed on Aug. 19, 2005.

(60) Provisional application No. 60/665,766, filed on Mar. 28, 2005.

(51) Int. Cl.
*G06F 1/00* (2006.01)
*G05F 1/10* (2006.01)
*H02M 5/45* (2006.01)

(52) U.S. Cl. ............................ 713/300; 327/538; 363/37

(58) Field of Classification Search ................. 713/300, 713/340
See application file for complete search history.

(56) References Cited

U.S. PATENT DOCUMENTS

| | | | | |
|---|---|---|---|---|
| 3,831,077 | A * | 8/1974 | Richeson, Jr. | 363/37 |
| 5,936,514 | A * | 8/1999 | Anderson et al. | 323/234 |
| 6,546,494 | B1 * | 4/2003 | Jackson et al. | 713/300 |
| 7,145,439 | B2 * | 12/2006 | Darshan et al. | 340/310.11 |
| 7,248,097 | B2 * | 7/2007 | Montgomery | 327/538 |
| 7,356,588 | B2 * | 4/2008 | Stineman et al. | 709/224 |
| 2004/0263321 | A1 * | 12/2004 | Hair et al. | 340/310.01 |
| 2005/0078700 | A1 * | 4/2005 | Thompson et al. | 370/463 |
| 2005/0132240 | A1 * | 6/2005 | Stineman et al. | 713/300 |
| 2005/0135258 | A1 * | 6/2005 | Amrod et al. | 370/241 |
| 2005/0184593 | A1 * | 8/2005 | Gottlieb et al. | 307/66 |
| 2006/0100799 | A1 * | 5/2006 | Karam | 702/57 |

OTHER PUBLICATIONS

Mendelson et al, All you need to know about Power over Ethernet (PoE) and the IEEE 802.3af Standard, PowerDsine, p. 24.*

* cited by examiner

*Primary Examiner*—Suresh K Suryawanshi
(74) *Attorney, Agent, or Firm*—Koestner Bertani LLP; Ken J. Koestner

(57) ABSTRACT

In a network device, a power potential rectifier is adapted to conductively couple a network connector to an integrated circuit that rectifies and passes a power signal and data signal received from the network connector. The power potential rectifier regulates a received power and/or data signal to ensure proper signal polarity is applied to the integrated circuit.

23 Claims, 14 Drawing Sheets

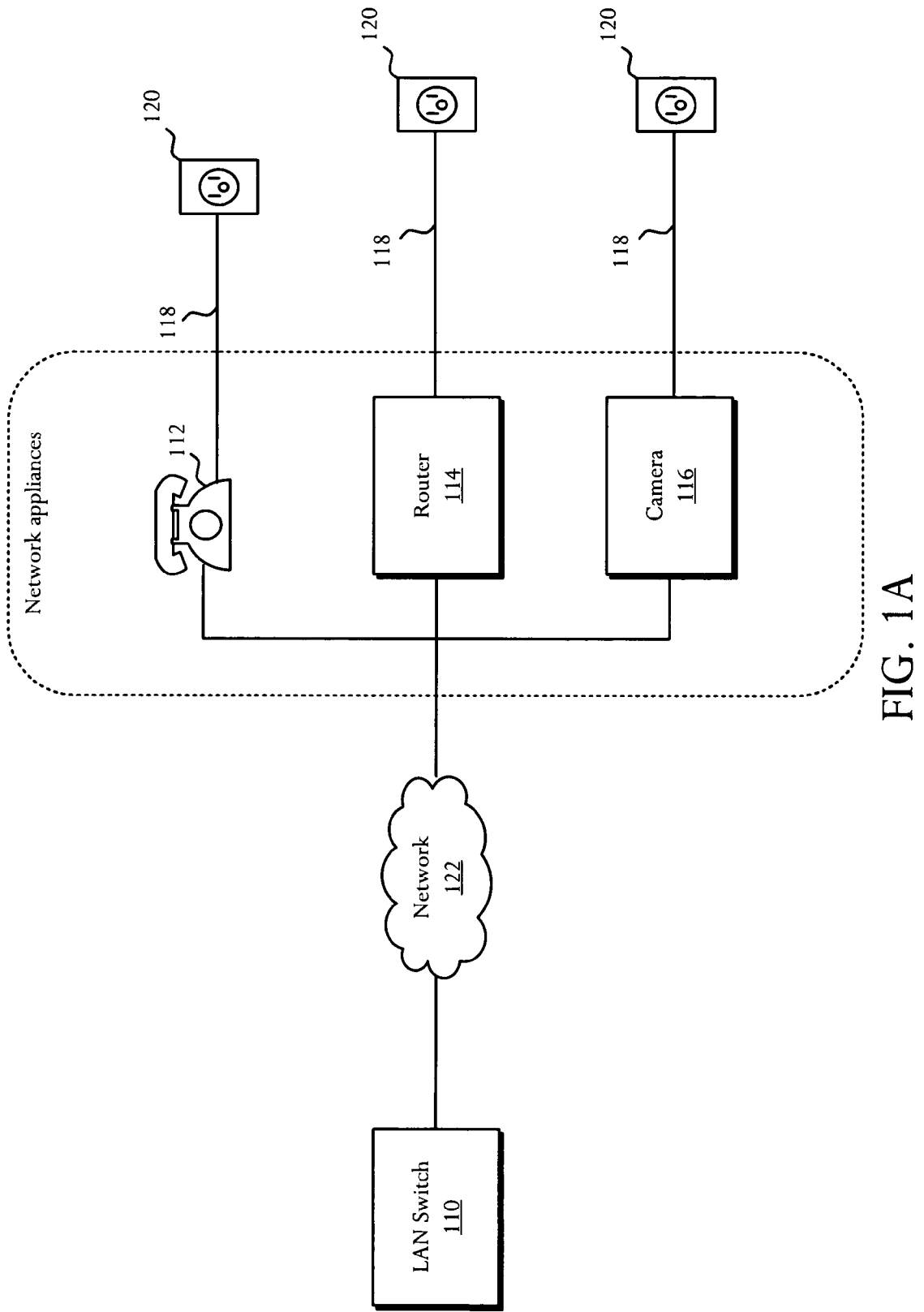

NETWORK DEVICE WITH POWER POTENTIAL RECTIFIER

CROSS REFERENCE TO RELATED APPLICATIONS

This application claims the benefit of priority to and incorporates herein by reference in its entirety for all purposes, U.S. Provisional Patent Application No. 60/665,766 entitled "SYSTEMS AND METHODS OPERABLE TO ALLOW LOOP POWERING OF NETWORKED DEVICES," by John R. Camagna, et al. filed on Mar. 28, 2005. This application is related to and incorporates herein by reference in its entirety for all purposes, U.S. patent application Ser. No. 11/207,595 entitled "METHOD FOR HIGH VOLTAGE POWER FEED ON DIFFERENTIAL CABLE PAIRS," by John R. Camagna, et al. filed Aug. 19, 2005; and Ser. No. 11/207,602 entitled "A METHOD FOR DYNAMIC INSERTION LOSS CONTROL FOR 10/100/1000 MHZ ETHERNET SIGNALLING," by John R. Camagna, et al., which have been filed concurrently filed Aug. 19, 2005.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VOIP) telephones and other devices, are increasingly deployed and consume power. When compared to traditional counterparts, network appliances use an additional power feed. One drawback of VOIP telephony is that in the event of a power failure the ability to contact emergency services via an independently powered telephone is removed. The ability to distribute power to network appliances or circuits enable network appliances such as a VOIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, standards that are incorporated herein by reference. However, power distribution schemes within a network environment typically employ cumbersome, real estate intensive, magnetic transformers. Additionally, power over Ethernet (PoE) specifications under the IEEE 802.3 standard are stringent and often limit allowable power.

Many limitations are associated with use of magnetic transformers. Transformer core saturation can limit current that can be sent to a power device, possibly further limiting communication channel performance. Cost and board space associated with the transformer comprise approximately 10 percent of printed circuit board (PCB) space within a modern switch. Additionally, failures associated with transformers often account for a significant number of field returns. Magnetic fields associated with the transformers can result in lower electromagnetic interference (EMI) performance.

However, magnetic transformers also perform several important functions such as supplying DC isolation and signal transfer in network systems. Thus, an improved approach to distributing power in a network environment may be sought that addresses limitations imposed by magnetic transformers while maintaining transformer benefits.

SUMMARY

According to an embodiment of a network device, a power potential rectifier is adapted to conductively couple a network connector to an integrated circuit that rectifies and passes a power signal and data signal received from the network connector. The power potential rectifier regulates a received power and/or data signal to ensure proper signal polarity is applied to the integrated circuit.

BRIEF DESCRIPTION OF THE DRAWINGS

Embodiments of the invention relating to both structure and method of operation may best be understood by referring to the following description and accompanying drawings:

FIGS. 1A and 1B are schematic block diagrams that respectively illustrate a high level example embodiments of client devices in which power is supplied separately to network attached client devices, and a switch that is a power supply equipment (PSE)-capable power-over Ethernet (PoE) enabled LAN switch that supplies both data and power signals to the client devices;

DETAILED DESCRIPTION

Figure 1B:
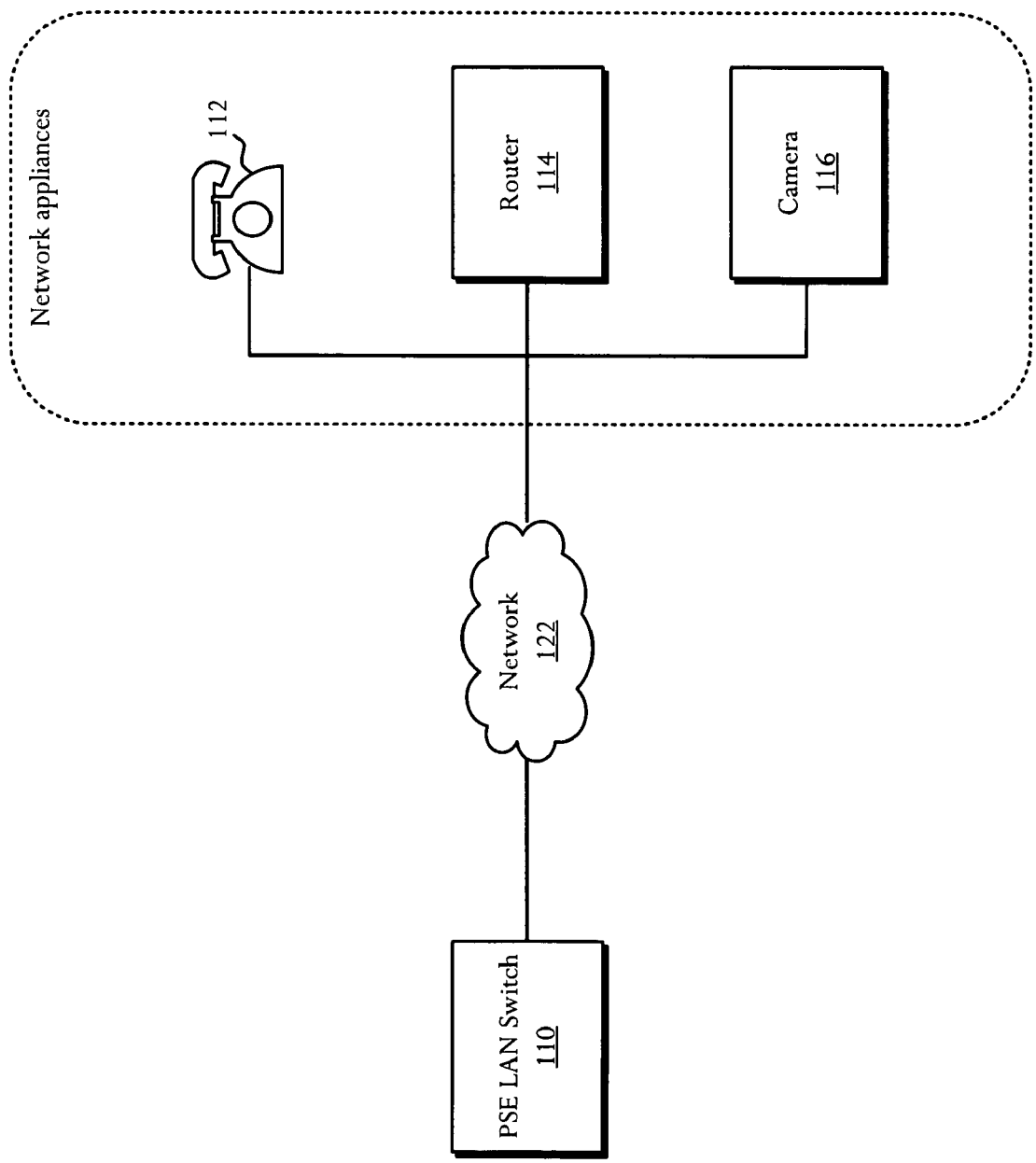

Electrostatic discharge (ESD) and power rectification can be attained through integration of elements available in a complementary metal oxide semiconductor (CMOS) high-voltage process. High voltage isolation can be implemented via a power potential rectifier that regulates a received power and/or data signal to ensure proper signal polarity is applied to the integrated circuit.

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various configurations described herein, a magnetic transformer of conventional systems may be eliminated while transformer functionality is maintained. Techniques enabling replacement of the transformer may be implemented in the form of integrated circuits (ICs) or discrete components.

In various embodiments, bridging circuits can be implemented that are connected directly to lines of the network interface with no intervening transformer. Coupling is present between the paired lines. Therefore, the bridging circuits may be configured to reduce or minimize cross-talk. The bridging circuits may be further configured to track the Ethernet signal with reduced or minimal signal degradation, while pulling and rectifying the power signal which is then passed to a T connect that facilitates separation of the Ethernet signal from the power signal. Some illustrative bridging circuits may be constructed from metal oxide semiconductor field effect transistors (MOSFETs), although diodes or other active circuits may be used in other implementations with some variability in aspects of performance. Aspects of the design involve consideration of the intimate association of the Ethernet and power signals, and handling of the association in optimizing performance characteristics including power loss, cross-talk, Ethernet signal fidelity, and other considerations.

The illustrative bridge circuit includes a limiter circuit which is adapted to ensure that the gate-to-source voltage of each line oscillates with the Ethernet signal so that the voltage across the switch remains relative constant since the Ethernet signal is passed on the line. The bridge circuit reduces or minimizes cross-talk by ensuring that gates are off with respect to lines that are not connected to lines Tc_vdd and Tc_gnd. The circuits ensure that all gates are off for the lines that are not powered and therefore disconnect cross-coupling from various pins from the RJ45 connector.

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other known network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution between the integrated circuit and cable that uses transformer-less ICs with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard.

Various embodiments of the depicted system may support solid state, and thus non-magnetic, transformer circuits operable to couple high bandwidth data signals and power signals with new mixed-signal IC technology, enabling elimination of cumbersome, real-estate intensive magnetic-based transformers.

Typical conventional communication systems use transformers to perform common mode signal blocking, 1500 volt isolation, and AC coupling of a differential signature as well as residual lightning or electromagnetic shock protection. The functions are replaced by a solid state or other similar circuits in accordance with embodiments of circuits and systems described herein whereby the circuit may couple directly to the line and provide high differential impedance and low common mode impedance. High differential impedance enables separation of the physical layer (PHY) signal from the power signal. Low common mode impedance enables elimination of a choke, allowing power to be tapped from the line. The local ground plane may float to eliminate a requirement for 1500 volt isolation. Additionally, through a combination of circuit techniques and lightning protection circuitry, voltage spike or lightning protection can be supplied to the network attached device, eliminating another function performed by transformers in traditional systems or arrangements. The disclosed technology may be applied anywhere transformers are used and is not limited to Ethernet applications.

Specific embodiments of the circuits and systems disclosed herein may be applied to various powered network attached devices or Ethernet network appliances. Such appliances include, but are not limited to VoIP telephones, routers, printers, and other similar devices.

Figure 2:
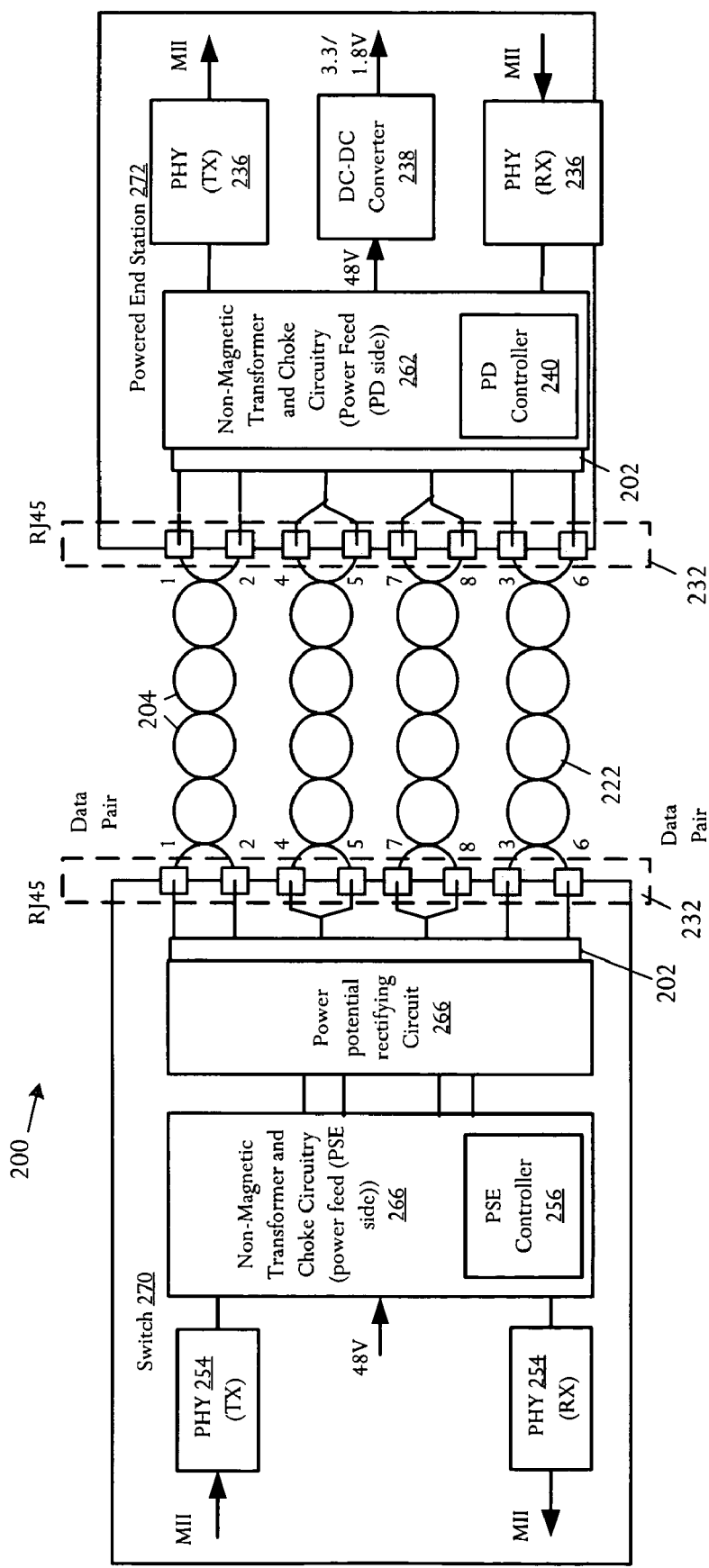
FIG. 2 is a functional block diagram illustrating a network interface including a network powered device (PD) interface and a network power supply equipment (PSE) interface, each implementing a non-magnetic transformer and choke circuitry.

Referring to FIG. 2, a functional block diagram depicts an embodiment of a network device 200 including to power potential rectification. The illustrative network device comprises a power potential rectifier 202 adapted to conductively couple a network connector 232 to an integrated circuit 270, 272 that rectifies and passes a power signal and data signal received from the network connector 232. The power potential rectifier 202 regulates a received power and/or data signal to ensure proper signal polarity is applied to the integrated circuit 270, 272.

The network device 200 is shown with the power sourcing switch 270 sourcing power through lines 1 and 2 of the network connector 232 in combination with lines 3 and 6.

In some embodiments, the power potential rectifier 202 is configured to couple directly to lines of the network connector 232 and regulate the power signal whereby the power potential rectifier 202 passes the data signal with substantially no degradation.

In some configuration embodiments, the network connector 232 receives multiple twisted pair conductors 204, for example twisted 22-26 gauge wire. Any one of a subset of the twisted pair conductors 204 can forward bias to deliver current and the power potential rectifier 202 can forward bias a return current path via a remaining conductor of the subset.

FIG. 2 illustrates the network interface 200 including a network powered device (PD) interface and a network power supply equipment (PSE) interface, each implementing a non-magnetic transformer and choke circuitry. A powered end station 272 is a network interface that includes a network connector 232, non-magnetic transformer and choke power feed circuitry 262, a network physical layer 236, and a power converter 238. Functionality of a magnetic transformer is replaced by circuitry 262. In the context of an Ethernet network interface, network connector 232 may be a RJ45 connector that is operable to receive multiple twisted wire pairs. Protection and conditioning circuitry may be located between network connector 232 and non-magnetic transformer and choke power feed circuitry 262 to attain surge protection in the form of voltage spike protection, lighting protection, external shock protection or other similar active functions. Conditioning circuitry may be a diode bridge or other rectifying component or device. A bridge or rectifier may couple to individual conductive lines 1-8 contained within the RJ45 connector. The circuits may be discrete components or an integrated circuit within non-magnetic transformer and choke power feed circuitry 262.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

In the powered end station 272, conductors 1 through 8 of the network connector 232 couple to non-magnetic transformer and choke power feed circuitry 262. Non-magnetic transformer and choke power feed circuitry 262 may use the power feed circuit and separate the data signal portion from the power signal portion. The data signal portion may then be passed to the network physical layer (PHY) 236 while the power signal passes to power converter 238.

If the powered end station 272 is used to couple the network attached device or PD to an Ethernet network, network physical layer 236 may be operable to implement the 10 Mbps, 100 Mbps, and/or 1 Gbps physical layer functions as well as other Ethernet data protocols that may arise. The Ethernet PHY 236 may additionally couple to an Ethernet media access controller (MAC). The Ethernet PHY 236 and Ethernet MAC when coupled are operable to implement the hardware layers of an Ethernet protocol stack. The architecture may also be applied to other networks. If a power signal is not received but a traditional, non-power Ethernet signal is received the non-magnetic power feed circuitry 262 still passes the data signal to the network PHY.

The power signal separated from the network signal within non-magnetic transformer and choke power feed circuit 262 by the power feed circuit is supplied to power converter 238. Typically the power signal received does not exceed 57 volts SELV (Safety Extra Low Voltage). Typical voltage in an Ethernet application is 48-volt power. Power converter 238 may then further transform the power as a DC to DC converter to provide 1.8 to 3.3 volts, or other voltages specified by many Ethernet network attached devices.

Power-sourcing switch 270 includes a network connector 232, Ethernet or network physical layer 254, PSE controller 256, non-magnetic transformer and choke power supply circuitry 266, and possibly a multiple-port switch. Transformer functionality is supplied by non-magnetic transformer and choke power supply circuitry 266. Power-sourcing switch 270 may be used to supply power to network attached devices. Powered end station 272 and power sourcing switch 270 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a Home-PNA local area network and other similar networks. Home-PNA uses existing telephone wires to share a single network connection within a home or building. Alternatively, embodiments may be applied where network data signals are provided over power lines.

Non-magnetic transformer and choke power feed circuitry 262 and 266 enable elimination of magnetic transformers with integrated system solutions that enable an increase in system density by replacing magnetic transformers with solid state power feed circuitry in the form of an integrated circuit or discreet component.

In some embodiments, non-magnetic transformer and choke power feed circuitry 262, network physical layer 236, power distribution management circuitry 254, and power converter 238 may be integrated into a single integrated circuit rather than discrete components at the printed circuit board level. Optional protection and power conditioning circuitry may be used to interface the integrated circuit to the network connector 232.

The Ethernet PHY may support the 10/100/1000 Mbps data rate and other future data networks such as a 10000 Mbps Ethernet network. Non-magnetic transformer and choke power feed circuitry 262 supplies line power minus the insertion loss directly to power converter 238, converting power first to a 12V supply then subsequently to lower supply levels. The circuit may be implemented in any appropriate process, for example a 0.18 or 0.13 micron process or any suitable size process.

Non-magnetic transformer and choke power feed circuitry 262 may implement functions including IEEE 802.3.af signaling and load compliance, local unregulated supply generation with surge current protection, and signal transfer between the line and integrated Ethernet PHY. Since devices are directly connected to the line, the circuit may be implemented to withstand a secondary lightning surge.

For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to nodes of the power feed circuit. Any one of the conductors 1, 4, 7 or 3 of the network RJ45 connection can forward bias to deliver current and any one of the return diodes connected can forward bias to form a return current path via one of the remaining conductors. Conductors 2, 5, 8 and 4 are connected similarly.

Non-magnetic transformer and choke power feed circuitry 262 applied to PSE may take the form of a single or multiple port switch to supply power to single or multiple devices attached to the network. Power sourcing switch 270 may be operable to receive power and data signals and combine to communicate power signals which are then distributed via an attached network. If power sourcing switch 270 is a gateway or router, a high-speed uplink couples to a network such as an Ethernet network or other network. The data signal is relayed via network PHY 254 and supplied to non-magnetic transformer and choke power feed circuitry 266. PSE switch 270 may be attached to an AC power supply or other internal or external power supply to supply a power signal to be distributed to network-attached devices that couple to power sourcing switch 270. Power controller 256 within or coupled to non-magnetic transformer and choke power feed circuitry 266 may determine, in accordance with IEEE standard 802.3af, whether a network-attached device in the case of an Ethernet network-attached device is a device operable to receive power from power supply equipment. When determined that an IEEE 802.3af compliant powered device (PD) is attached to the network, power controller 256 may supply power from power supply to non-magnetic transformer and choke power feed circuitry 266, which is sent to the downstream network-attached device through network connectors, which in the case of the Ethernet network may be an RJ45 receptacle and cable.

IEEE 802.3af Standard is to fully comply with existing non-line powered Ethernet network systems. Accordingly, PSE detects via a well-defined procedure whether the far end is PoE compliant and classify sufficient power prior to applying power to the system. Maximum allowed voltage is 57 volts for compliance with SELV (Safety Extra Low Voltage) limits.

For backward compatibility with non-powered systems, applied DC voltage begins at a very low voltage and only begins to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts where power MOSFETs are enabled and the large bypass capacitor begins to charge.

A maintain power signature is applied in the PoE signature block—a minimum of 10 mA and a maximum of 23.5 kohms may be applied for the PSE to continue to feed power. The maximum current allowed is limited by the power class of the device (class 0-3 are defined). For class 0, 12.95 W is the maximum power dissipation allowed and 400 ma is the maximum peak current. Once activated, the PoE will shut down if the applied voltage falls below 30V and disconnect the power MOSFETs from the line.

Power feed devices in normal power mode provide a differential open circuit at the Ethernet signal frequencies and a differential short at lower frequencies. The common mode circuit presents the capacitive and power management load at frequencies determined by the gate control circuit.

Figure 3:
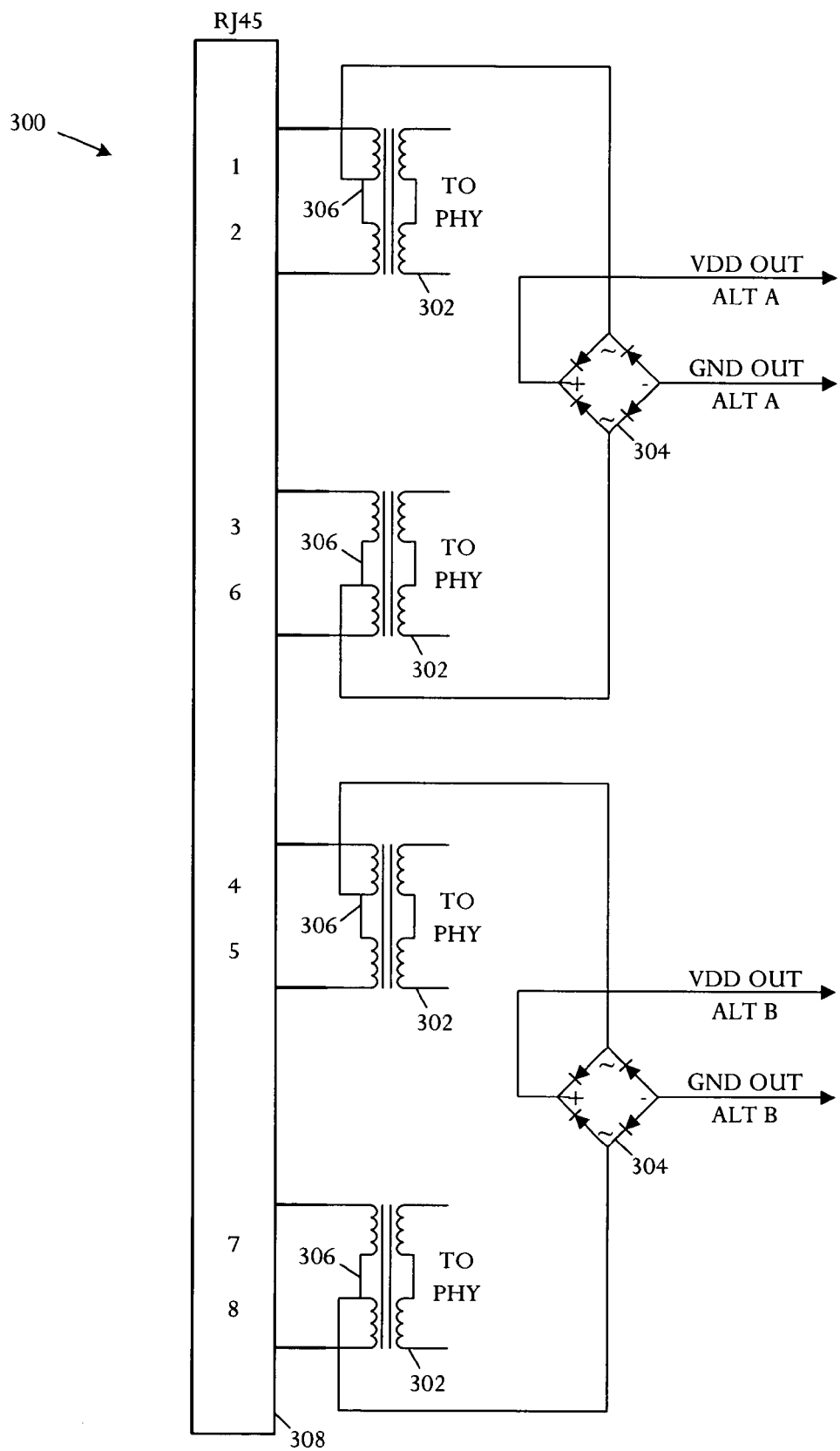
FIG. 3 is a schematic circuit diagram showing an example of a configuration for a network interface that includes magnetic transformers and diode bridges to rectify power signals received from the transformers.

Referring to FIG. 3, a schematic circuit diagram illustrates an example of a conventional configuration for a network interface 300 that includes magnetic transformers 302 and diode bridges 304 with the diode bridges 304 receiving input signals from the center taps 306 of the transformers 302. Transformers 302 are connected across line pairs 1 and 2, 4 and 5, 7 and 8, and 3 and 6. A first diode bridge 304 receives input power and data signals from the center taps of the transformers 302 connected across lines 1 and 2, and connected across lines 4 and 5 of the network connector 308. A second diode bridge 304 receives input power and data signals from the center taps of the transformers 302 connected across lines 7 and 8, and connected across lines 3 and 6 of the network connector 308.

The illustrative network interface 300 may be implemented as part of a powered device (PD) that receives power sourced by power sourcing equipment (PSE), for example, on line pairs 1 and 2, and 3 and 6 on the network connector 308. Each diode bridge 304 has two connections to center taps of two respective transformers 302. One of the two connections is at supply potential, for example VDD, and one is at ground potential. Power is applied to the two input terminals of the diode bridge 304 at a high potential and a low potential but the potential applied to a particular input terminal is not known. Thus, the diode bridge rectifies the power signal so that no matter how power is connected, one output line is always at the VDD supply potential (VDD OUT) and another output line is at ground potential (GND OUT). A disadvantage of the diode bridge 304 is a lossy rectification performance.

Figure 4:
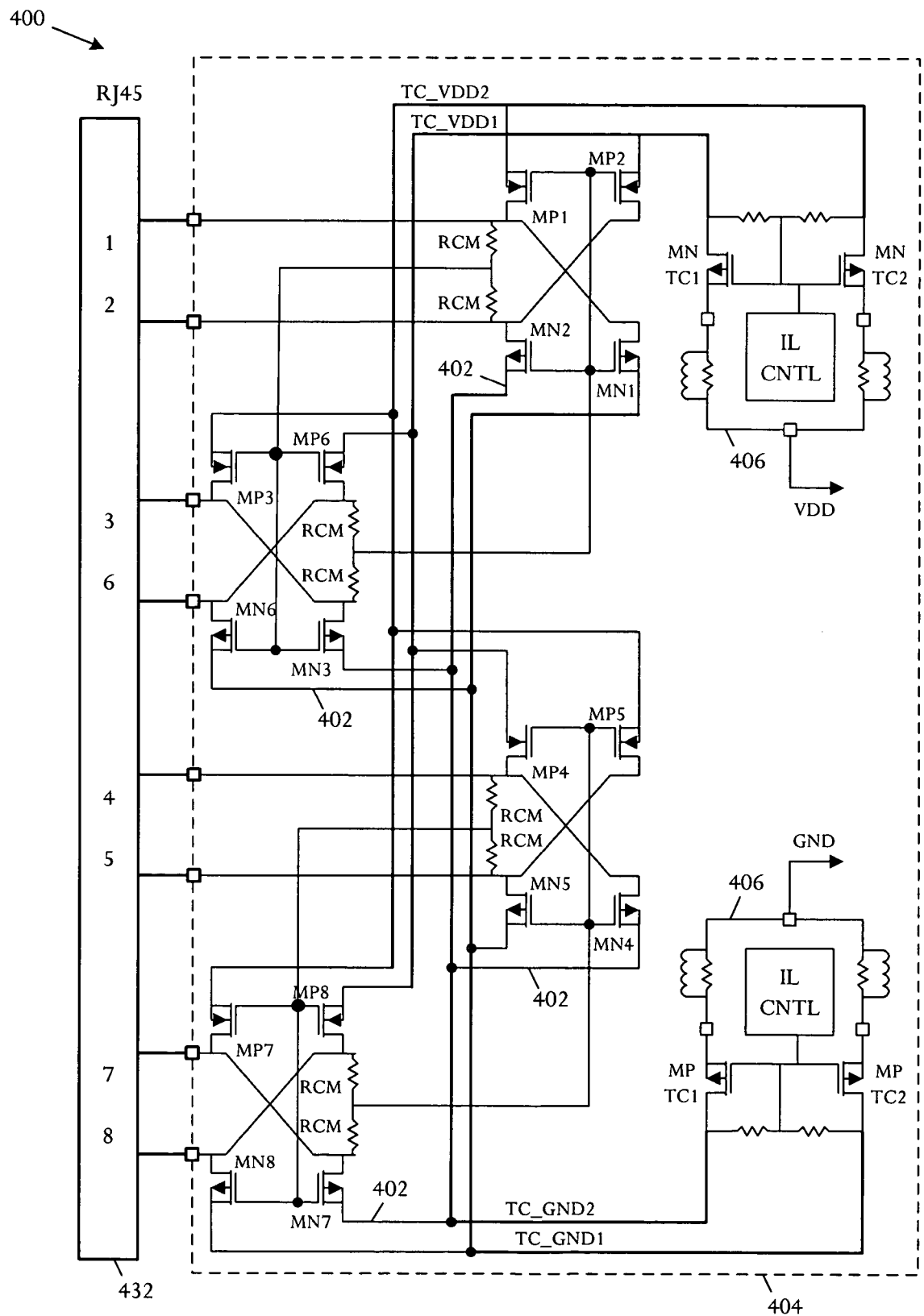
FIG. 4 is a schematic circuit diagram illustrating an embodiment of a network device including a transistor bridge integrated onto an integrated circuit that rectifies and passes a power signal and data signal received from the network connector.

In some embodiments, a network interface can be configured that enables elimination of the transformers. Referring to FIG. 4, a schematic circuit diagram illustrates an embodiment of a network device 400 including a transistor bridge 402 integrated onto an integrated circuit 404 that rectifies and passes a power signal and data signal received from the network connector 432. In the illustrative embodiment, a metal oxide semiconductor (MOS) bridge is integrated onto the integrated circuit.

The transistor bridge 402 is adapted for direct connection to the network connector 432, enabling elimination of an intervening transformer. The illustrative transistor bridge 402 is power bridge circuitry that connects into a T connect element 406 in a configuration whereby power rectification functionality integrated on the integrated circuit 404.

The transistor bridge 402 is configured for integration into the integrated circuit 404 and is adapted to regulate a power and/or data signal to ensure proper power potential polarity is applied to the integrated circuit 404.

The transistor bridge 402 couples directly to lines of the network connector 432 and regulates the power signal whereby the transistor bridge 402 passes the data signal with substantially no degradation. Thus, the transistor bridge 402 performs the signal rectification function of the diode bridge depicted in FIG. 3 while essentially eliminating power signal loss that is inherent in the diode implementation. The transistor bridge 402 is depicted as a metal oxide semiconductor field effect transistor (MOSFET) bridge that is used as a power rectification circuit rather than a diode bridge to enable routing of power substantially without voltage or power loss. In contrast, a diode bridge loses power due to voltage loss across the diodes. The MOSFET implementation avoids loss and saves, in a typical worst case condition, about 5% of power.

The metal oxide semiconductor (MOS) bridge 402 comprises N-channel metal oxide semiconductor (NMOS) transistors and P-channel metal oxide semiconductor (PMOS) transistors connected in a bridge configuration that emulates a diode bridge with pairs of NMOS transistors replacing diodes that connect to ground and pairs of PMOS transistors replacing diodes that connect to a power line, for example VDD. Each MOSFET bridge 402 comprises a set of four transistors including two N-channel metal oxide semiconductor (NMOS) and two P-channel metal oxide semiconductor (PMOS) transistors. The PMOS transistors are paired and have mutually coupled gates. The NMOS transistors are paired also with coupled gates. Paired lines of the network connector 432 couple to the source-drain pathways of the respective PMOS and NMOS transistors on the input side of the bridge, and cross-couple to the source-drain pathways of the respective NMOS and PMOS transistors on the output side of the bridge. As shown in FIG. 4, the MOSFET bridge 402 comorises multiple MOS transistors with source and bulk connections tied to output voltage lines. The paired lines are connected through resistors RCM with a center connection between the resistors RCM coupled to the gates of an adjacent line pair. As shown, the center connection between lines 1 and 2 is coupled to gates of the MOSFET bridge coupled to lines 3 and 6. Similarly, the center connection between lines 3 and 6 is coupled to the gates of the MOSFET bridge coupled to lines 1 and 2. The MOSFET bridges coupled to line pairs 4 and 5, and 7 and 8 are similarly connected.

The network device 400 may further comprise a T connect element 406 and an Ethernet physical layer (PHY) module integrated into the integrated circuit 404. The T connect element 406 is adapted to enable the ground potential of the Ethernet PHY module to float relative to earth ground. The network device may further comprise a metal oxide semiconductor (MOS) bridge 402 integrated onto the integrated circuit and coupled to the T connect element 406.

Elimination of the transformers results in an increase in the number of bridging circuits. For example, as shown in the illustrative implementation, the integrated circuit 404 includes four transistor bridges 402, one for each pair of lines. In contrast, the interface with transformers shown in FIG. 3 has only two bridging circuits. Output power is routed through T connect elements 406 to present a high impedance to the lines because the Ethernet signals are communicated on the lines. The power signals Tc_vdd1, Tc_vdd2, Tc_gnd1, and Tc_gnd2 are supply lines to intermediate nodes. When Ethernet signals are communicated, the signals Tc_vdd1, Tc_vdd2, Tc_gnd1, and Tc_gnd2 oscillate near ground potential. The T connect elements 406 pull the power signal out of the bridges 402 with the Ethernet signal unaffected as a short circuit for common mode signals and an open circuit for differential signals.

The illustrative network device 400 has the network connector 432, for example an RJ45 connector, which is external to the integrated circuit 404. Any inductors in the network device 400 typically cannot be integrated. All other elements can be integrated within the integrated circuit 404. In other connect circuit embodiments, external components may be avoided or eliminated through usage of structures such as a cascaded T connect circuit.

The source-drain pathways of the PMOS transistors in the MOSFET bridges 402 supply power VDD to T connect elements 406, depicted on lines Tc_vdd1 and Tc_vdd2. The source-drain pathways of the NMOS transistors in the MOSFET bridges 402 supply ground GND to T connect elements 406, depicted on lines Tc_gnd1 and Tc_gnd2. The MOSFET bridges 402 enable supply of the power Tc_vdd1, Tc_vdd2 and ground lines Tc_gnd1, Tc_gnd2 to a powered device (PD) while also carrying an Ethernet signal. The illustrative configuration enables control of the four pairs of lines Tc_vdd1, Tc_vdd2, Tc_gnd1, and Tc_gnd2 on the output side of the MOSFET bridges 402 so that three of the lines can be held near ground while one, which operates as a power line, can be at a power level, for example 60 volts.

Although the network device 400 is depicted with a transistor bridge 402 using MOSFET transistors, in other embodiments various other types of transistors may be used including, for example, bipolar junction transistors (BJT), junction field effect transistors (JFET), switchable devices, impedance control devices, and others.

Figure 5A:
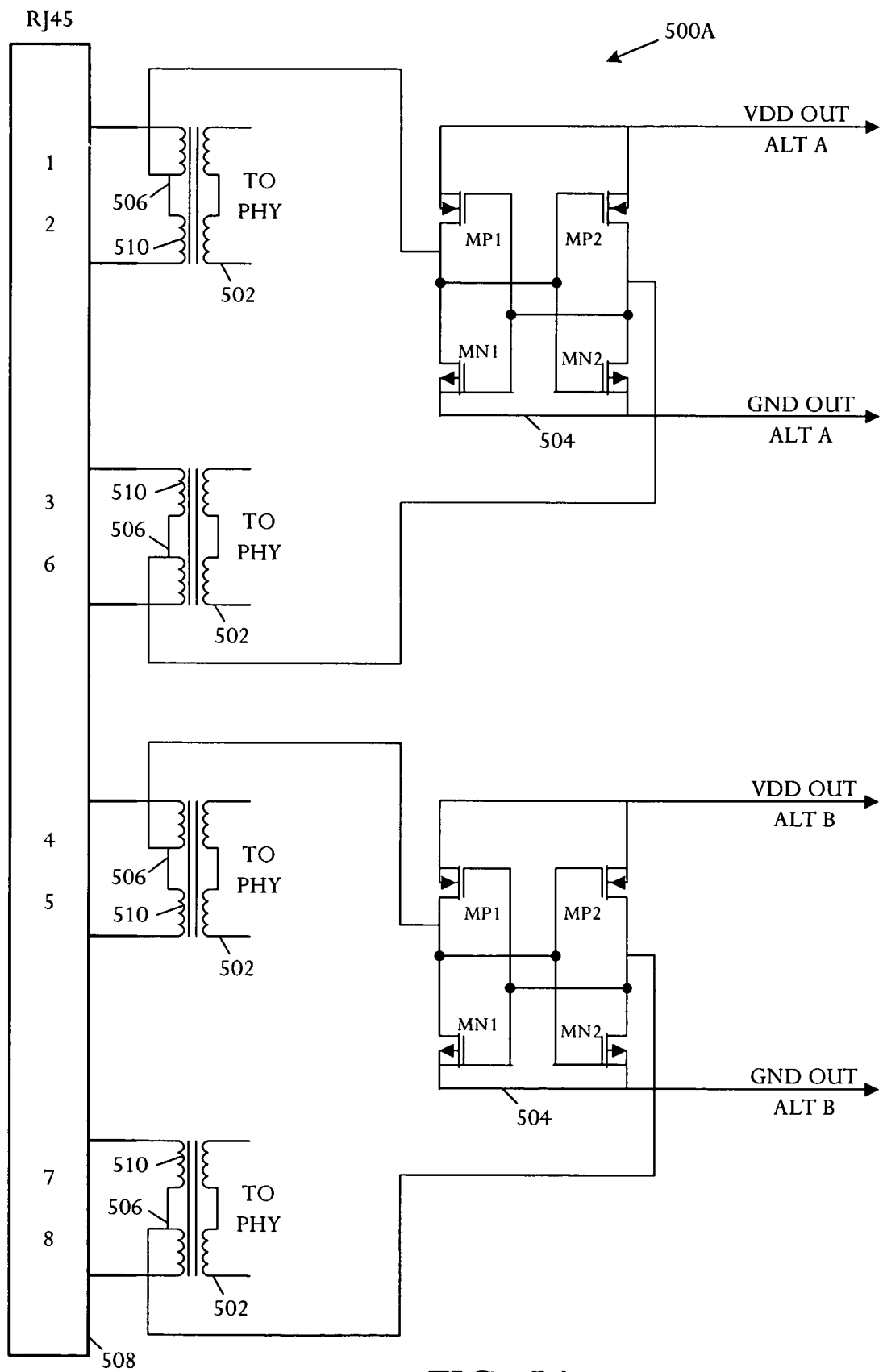
FIGS. 5A and 5B are functional circuit diagrams showing embodiments of network devices that include transformers whereby power is delivered via the center taps of the transformers.
Figure 5B:
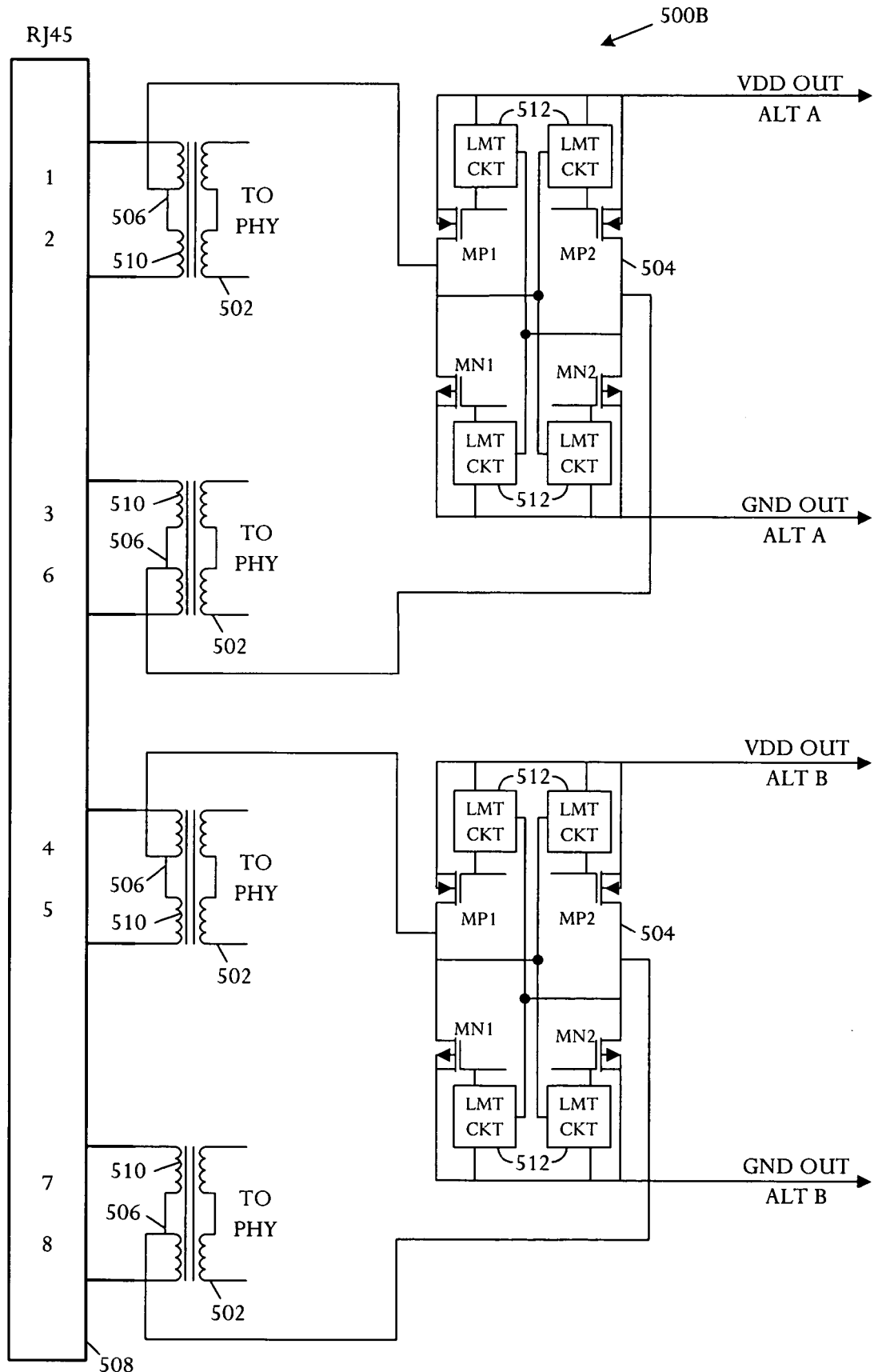

Referring to FIGS. 5A and 5B, functional circuit diagrams illustrate embodiments of network devices 500A and 500B that include transformers 502 whereby power is delivered via the center taps 506 of the transformers 502. The transformer center taps 506 separates the power signal from the data signal.

In addition to a power potential rectifier 504 that rectifies and passes a power signal and data signal received from a network connector 508, the network devices 500A, 500B further comprise one or more transformers 502 coupled across line pairs of the network connector 508. The transformers 502 comprising a coil 510 and a center tap 506 coupled to the coil 510. The center tap is configured to separate the power signal from the data signal. Power potential rectifiers 504 are coupled to the transformer center taps 506 and configured to regulate the power signal. In an illustrative embodiment, the power potential rectifier may be a MOSFET bridge.

Power signals accessed from the transformer center taps 506 cross-couple the input line pairs to ensure that one line pair is high and one line pair is low at any time. For example, in the illustrative structure it line pairs 1 and 2 are high, then line pairs 3 and 6 are low. Accordingly, the center tap voltage of lines 1 and 2 is used to control the NMOS transistor in the connected MOSFET rectifier 504 to control the other lines or route power to the other lines to ground. As shown in FIGS. 5A and 5B, the MOSFET bridge 504 comprises multiple MOS transistors with source and bulk connections tied to output voltage lines. Thus, if the same potential is tied to the PMOS transistor, which extends to the VDD OUT signal line, then the PMOS transistors are in an off state because lines 1 and 2 are high and the voltage at the center tap 506 of the transformer 502 controls the rectifier 504 so that PMOS transistors are turned on, routing power to VDD OUT, and NMOS transistors are turned off.

Although FIGS. 5A and 5B show network device embodiments 500A and 500B with MOSFET bridging circuits 504 in combination with transformers 502, other embodiments may employ rectifiers constructed from other transistor types such as junction field effect transistors (JFETs), bipolar transistors, and others.

The MOSFET bridging circuits can route power in configurations that include transformers as shown in FIGS. 5A and 5B, and in configurations that omit the transformers depicted in FIG. 4.

FIGS. 5A and 5B illustrate a technique for supplying power over a communication interface such as an Ethernet interface wherein power is supplied from the center tap 506 of a transformer 502. Center tapping of the transformer coil 510 enables power to be separated from the Ethernet signal. Power lines connected to the center taps of the transformers are connected to a rectifier bridge 504, illustrated as a MOSFET bridge, but which can be implemented in other forms such as junction field effect transistor (JFET), bipolar transistors, other switching devices, diode bridges, and others. The bridge 504 rectifies the power signal. In the illustrative embodiment, an RJ45 interface has eight lines with paired lines 1 and 2, 3 and 6, 4 and 5, and 7 and 8 respectively connected to two bridges or four bridges. Each bridge has two input lines, each supplied from the center tap of a transformer, and two output lines including a VDD supply out and a ground output. Input lines to the bridges are connected to the transformer center-tap rather than direct connections to the interface lines because direct connections can result in degradation to the Ethernet data signals. Bridge rectifier functional performance is determined by a capability to rectify the power signal and pass the Ethernet signal with a reduced or minimized degradation.

T connect circuits can be implemented following the bridges, which are not shown in FIGS. 5A and 5B, actually separate an Ethernet signal from the power signal.

FIG. 5B depicts a network device 500B similar to network device 500A but adding limiter circuits 512 to ensure operation within process limits.

Figure 6:
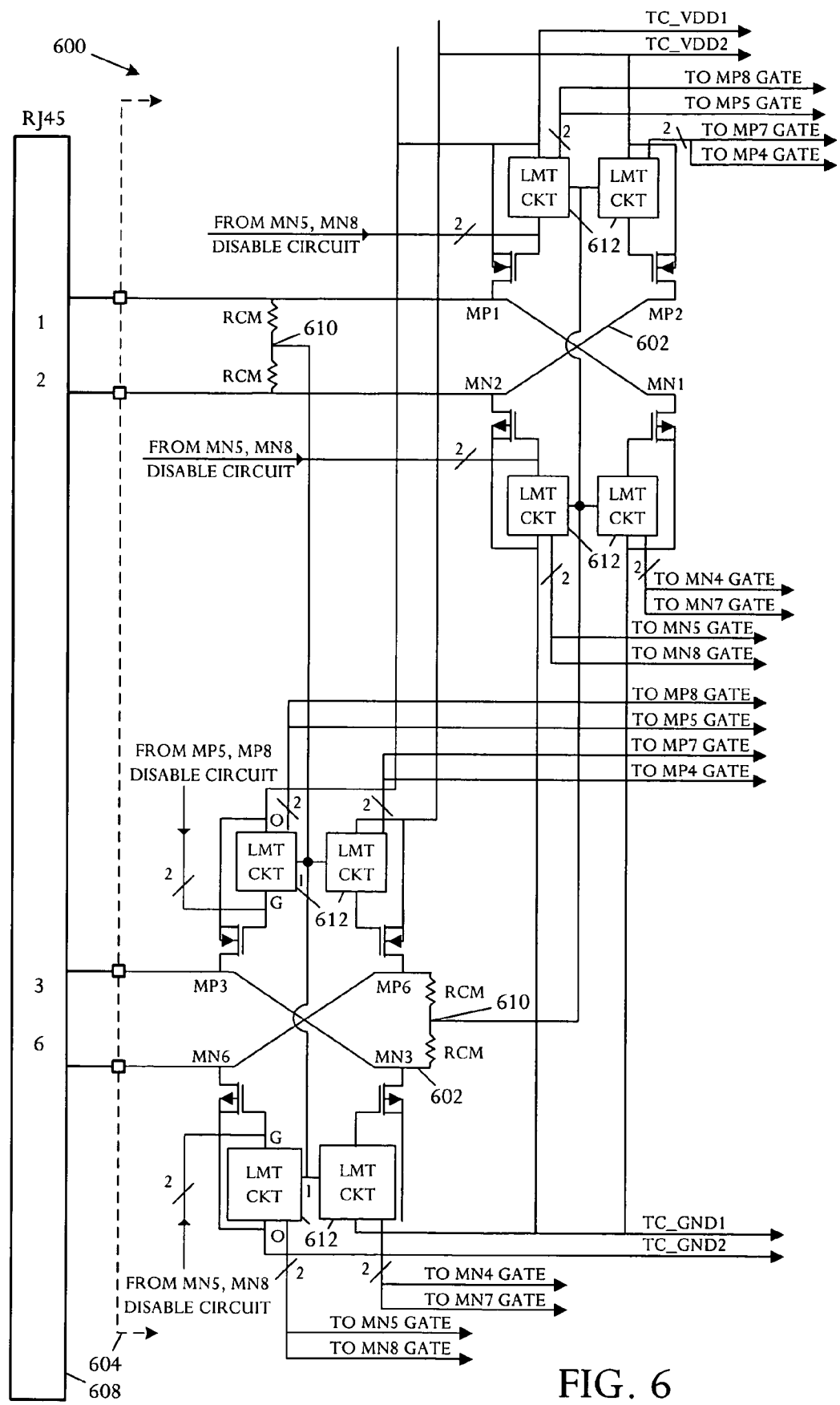
FIG. 6 is a partial functional block and circuit diagram illustrating an embodiment of a network device including limiter circuits that ensure operation within process limits and disable functionality.

Referring to FIG. 6, a partial functional block and circuit diagram illustrates an embodiment of a network device 600 including limiter circuits 612 which ensure operation within process limits and support functionality to disable bridge devices on opposing power lines. A particular process may impose limits on transistor gate voltages. For example, a particular process may impose a get voltage limit of 5 volts. Other similar processes may impose higher or lower limits. High voltage transistors may be used that are allowed to have large voltages across the drain source but not across the gate source, a useful characteristic because transistors may have large drain voltages. For example, a typical MOSFET may be a 5 volt device that can have a very large drain voltage. In addition to a limiter function, the limiter circuits 612 are supplemented by a disable functionality. The limiter and disable circuits 612 to ensure that gates of the MOS bridge are turned off for lines that are not powered.

The network device 600 may be configured to comprise a transistor bridge 602 integrated onto an integrated circuit 604. In a particular implementation, the transistor bridge 602 comprises transistors configured to enable relatively large drain-source voltage $V_{ds}$ and relatively small gate-source voltage $V_{gs}$. The transistors may be any suitable type. Some configurations may be formed using lateral double-diffused metal oxide semiconductor (LDMOS) transistors.

In another embodiment, the transistor bridge 602 may comprise a plurality of metal oxide semiconductor field-effect transistors (MOSFETs). Individual MOSFETs may be coupled to a limiter 612 configured to maintain an essentially constant gate-source voltage $V_{gs}$ across the MOSFET at approximately a process limit whereby resistance is minimized or reduced.

For a power over Ethernet (PoE) functionality, the limiters 612 can be configured so that current drawn during start-up is limited to a sufficiently low level. Accordingly, the limiter circuit 612 may be constructed in a simple form or more complicated form depending on the level of control that is desired. FIG. 6 shows cross-coupling between the MOSFET bridges 602. Center taps 610 between resistor (RCM)-connected paired lines of one MOSFET bridge 602 couple to limiter circuit connections of a second MOSFET bridge 602, as shown. Power and ground lines Tc_vdd1, Tc_vdd2, Tc_gnd1, and Tc_gnd2 pass signals to a T connect circuit.

The limiter circuits 612 are implemented, typically specific to the applied fabrication process, to ensure gate voltages are limited to a specified value.

The network device 600 is configured to reduce or minimize cross-talk between pairs of network cables. For example, signals on line pair 1 and 2 and signals on line pair 3 and 6 are mutually protected against cross talk. Line pair 4 and 5 and line pair 7 and 8 are similarly protected. Cross-talk is avoided by reducing or minimizing cross-coupling capacitances. In a specific embodiment, offset capacitance of the MOSFETs, which is cross-coupling capacitance, is reduced to a very small level. For example, line 2 from the network connector 608 is coupled to NMOS transistor MN2 and the source of transistor MN2 crosses back to NMOS transistor MN3. Accordingly, transistor MN3 is in an ON state when transistor MN2 is in an OFF state. If transistor MN3 is on, then the source of NMOS transistors MN2 and MN6 are mutually tied, creating a potential coupling between lines 2 and 6 through a reverse connection—when one device is on, the other is off. One technique for avoiding cross-coupling may be implemented by adjusting process technology to enable the capacitance of the transistor in the off state to be essentially zero. Another technique is design of the limiter circuit 612 to prevent high frequency coupling.

Figure 7A:
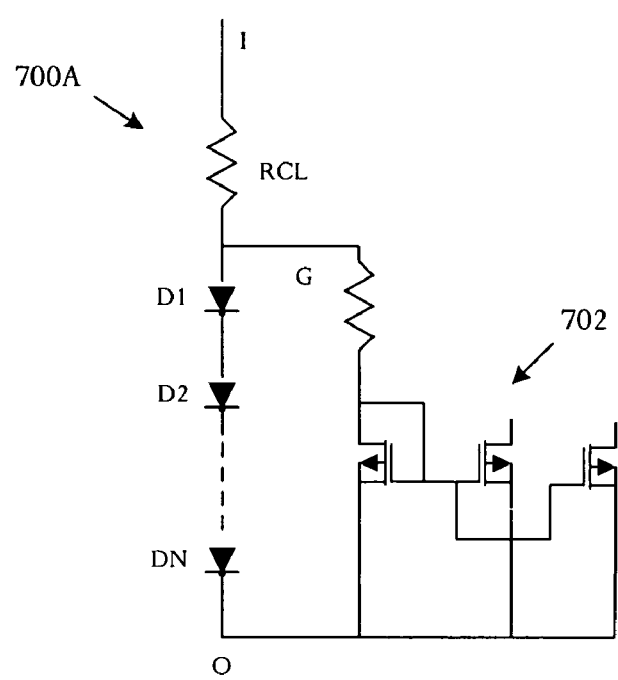
FIGS. 7A and 7B are circuit diagrams depicting example embodiments of limiter circuits that may be implemented in a network device.
Figure 7B:
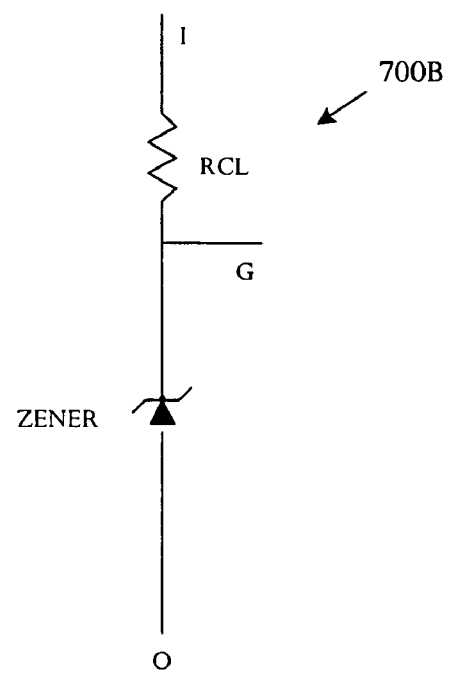

Referring to FIGS. 7A and 7B, circuit diagrams illustrate example embodiments of limiter circuits that may be implemented in a network device. Generally, the limiter circuits tie a gate (G) of a transistor to a common-mode signal of another line. Referring to FIG. 7A, a limiter circuit 700A comprises a stack of diodes (D1, D2, . . . , DN tied between input (I) and output (O) terminals. When all diodes are in an off state, the diodes are inverted due to the potential of an adjacent diode. The limiter 700A essentially eliminates cross-coupling even if drain to gate capacitance of the MOSFETs is large. Limiter circuit 700A also includes a disable circuit 702 that ensures that gates of the MOS bridge are turned off for lines that are not powered. FIG. 7B illustrates a limiter circuit 700B comprising a zener diode. In some embodiments, the limiter circuit 700B may also be implemented to include disable functionality.

Figure 8:
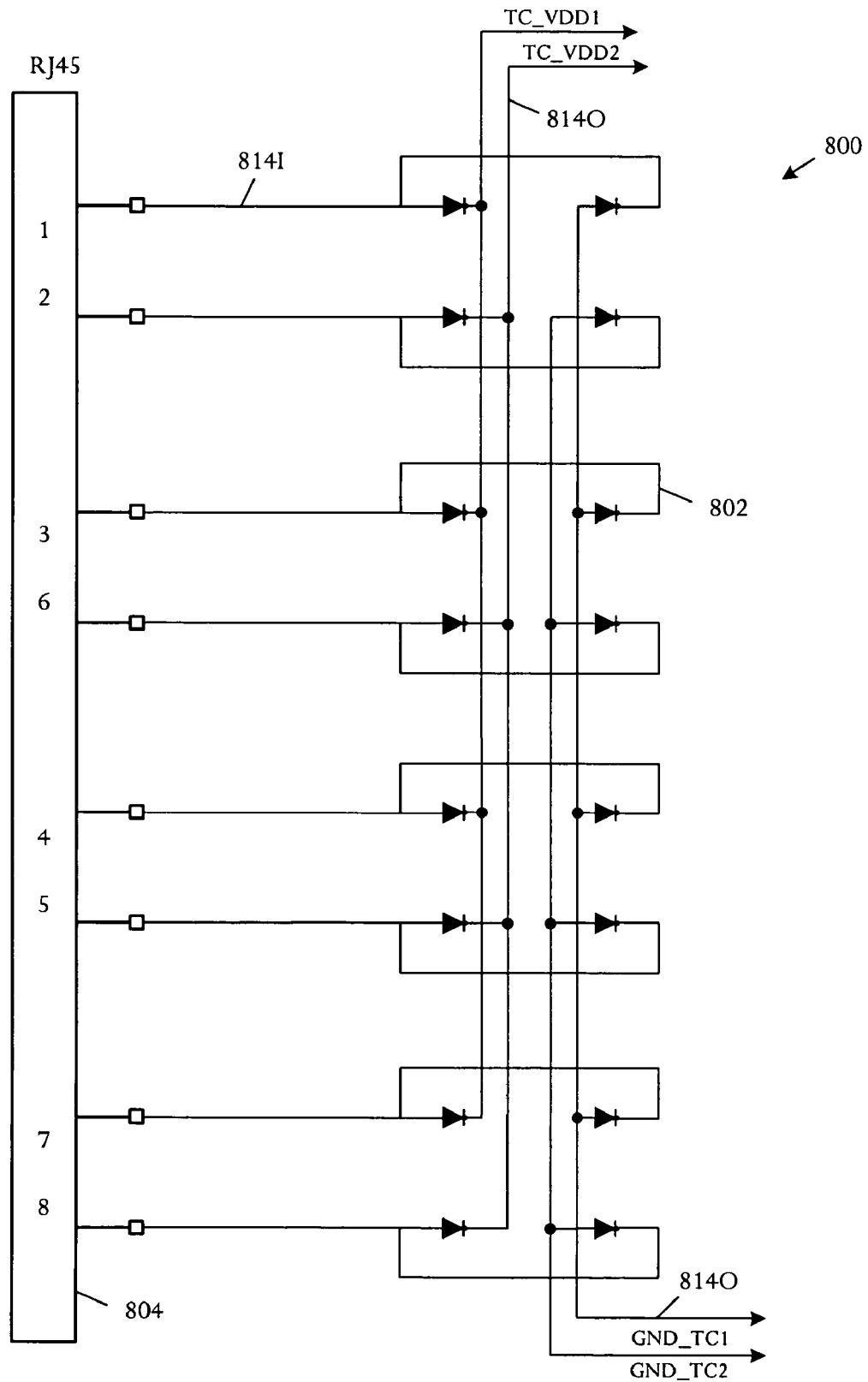
FIG. 8 is a schematic functional diagram depicting an embodiment of a network device that includes an integrated diode bridge integrated onto an integrated circuit.

Referring to FIG. 8, a schematic functional diagram depicts an embodiment of a network device 800 that includes an integrated diode bridge 802 integrated onto an integrated circuit 804 and coupled directly to lines of a network connector 804. The integrated diode bridge 802 comprises an input side 814I and an output side 814O with the input side coupled to the network connector lines and the output side coupled to at least one power line VDD_TC1, VDD_TC2 and at least one ground line GND_TC1, GND_TC2. Although the illustrative integrated diode bridge 802 illustratively feeds a T connect, in other embodiments the bridge can be configured to feed another type of power device. The power connection of the bridge circuit through the center tap of the transformer enables a configuration whereby the T connect may be eliminated. For example, a powered device may receive power directly such as through a MOSFET bridge, a diode bridge as depicted, or through another type of bridge.

The diode bridge 802 functions as a power rectifying diode bridge integrated onto the integrated circuit.

Figure 9:
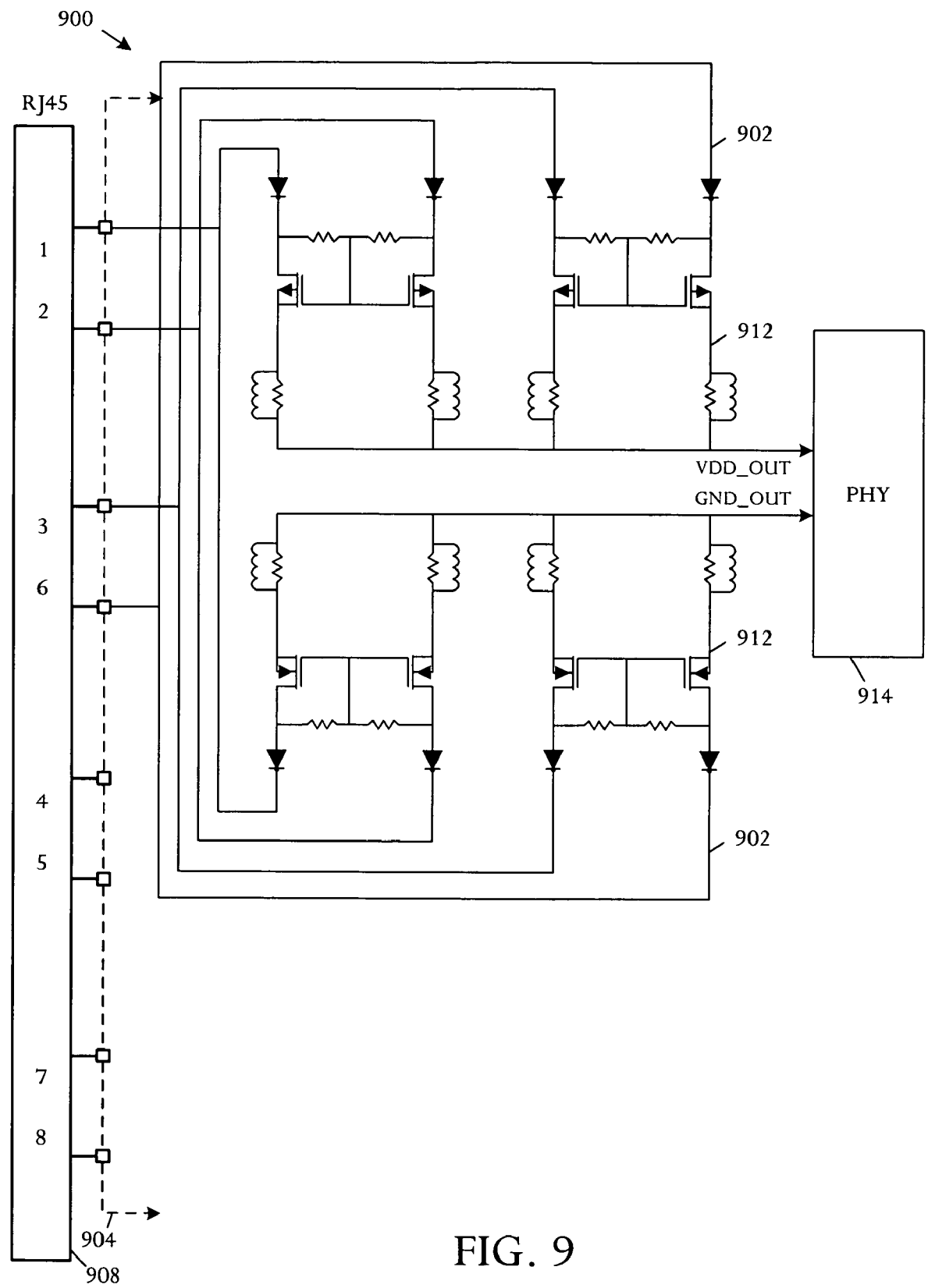
FIG. 9 is a functional circuit diagram illustrating an embodiment of a network device further comprising a T connect and rectification diodes that improves pair to pair isolation at the expense of larger area and inclusion of external components.

Referring to FIG. 9, a functional circuit diagram illustrates an embodiment of a network device 900 further comprising a T connect element 912 and an Ethernet physical layer (PHY) module 914 integrated into an integrated circuit 904. The illustrative network device 900 also includes rectification diodes that improve pair to pair isolation at the expense of larger area and inclusion of external components. The T connect element 912 is adapted to enable ground potential of the Ethernet PHY module 914 to float relative to earth ground. In the illustrative example, an integrated diode bridge 902 is integrated onto the integrated circuit 904 and couples individual lines of a network connector 908 through an integrated diode into T connect elements 912.

The integrated diode bridge 902 reduces cross-talk between the lines. Combined power and Ethernet signals are fed through diodes of the diode bridge 902 from each line. In comparison to a MOSFET bridge implementation, the network device 900 with diode bridges 902 generally has more T connect circuits 912 to reduce or minimize cross-talk to a similar level, and is more lossy due to the voltage drop across the diodes.

Figure 10:
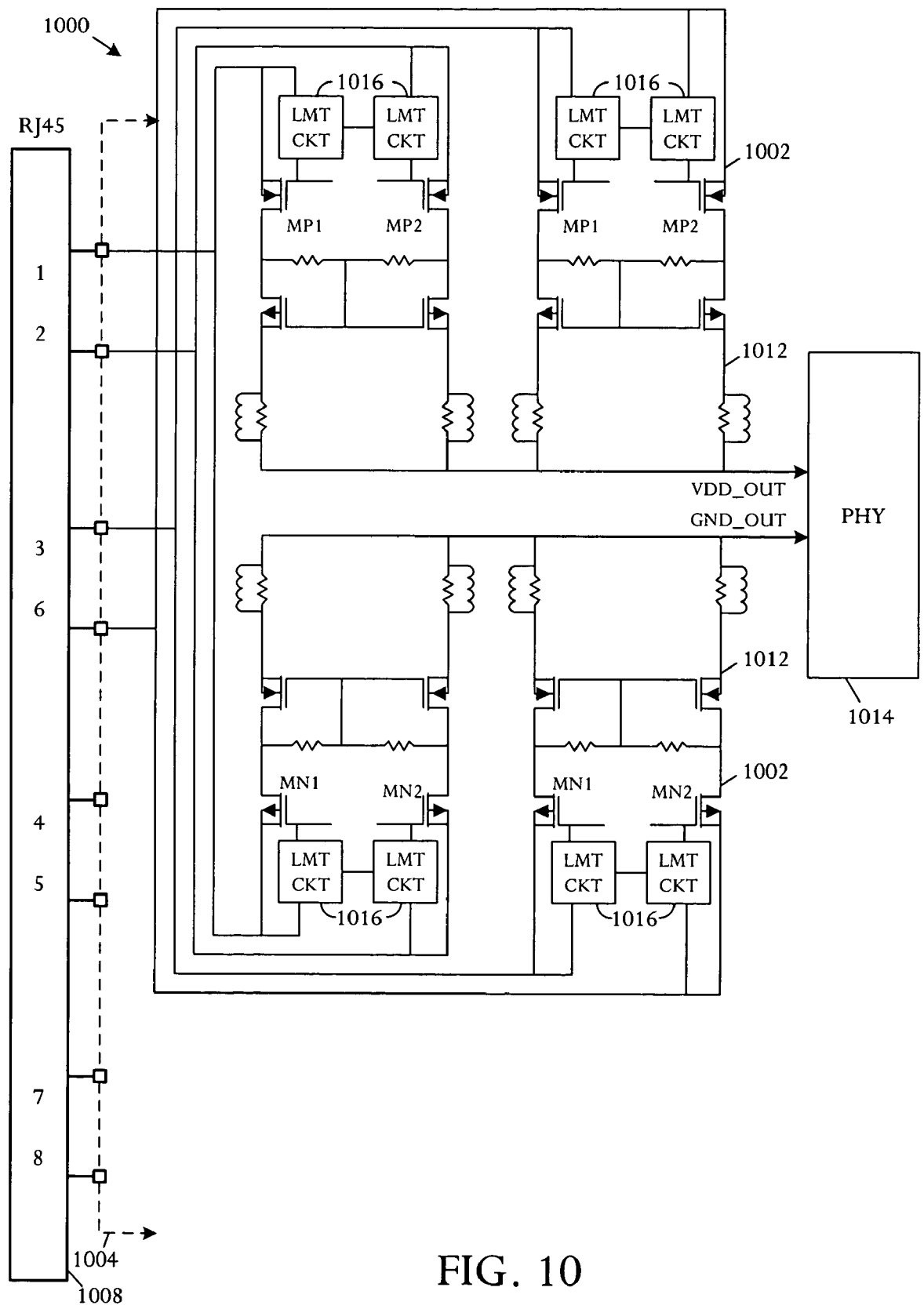
FIG. 10 is a functional circuit diagram illustrating an embodiment of a network device further comprising a T connect and metal oxide semiconductor (MOS) rectifying components that improve pair to pair isolation at the cost of a greater number of external components.

Referring to FIG. 10, a functional circuit diagram illustrates an embodiment of a network device 1000 including a T connect element 1012 and metal oxide semiconductor (MOS) rectifying components that improve pair to pair isolation at the cost of a greater number of external components. An Ethernet physical layer (PHY) module 1014 is integrated into an integrated circuit 1004. An integrated MOSFET bridge 1002 is integrated onto the integrated circuit 1004 and couples individual lines of a network connector 1008 through an integrated diode into T connect elements 1012. The illustrative network device 1000 eliminates loss associated with rectification and improves crosstalk performance at the cost of more T connect circuits and external components.

Figure 11:
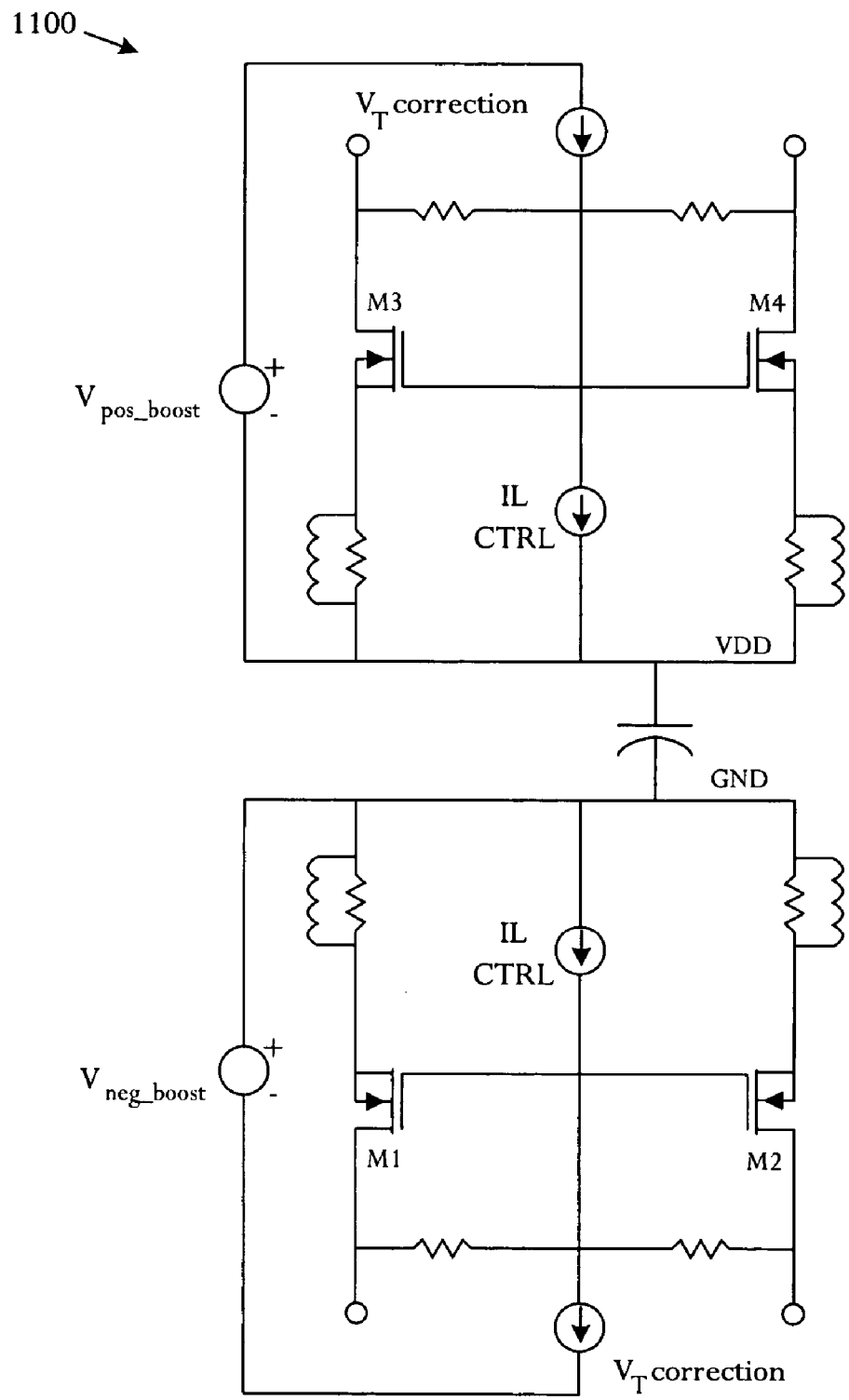
FIG. 11 is a schematic circuit diagram that illustrates an embodiment of a T connect circuit that is suitable for usage in a network device.

Referring to FIG. 11, a schematic circuit diagram illustrates an embodiment of a T connect circuit 1100 that is suitable for usage in a network device. The T connect circuit 1100 eliminates active amplifier control in case high-Q inductors are implemented in a design. With no active amplifier control, resistive feedback with current controls insertion loss. One current removes the threshold component of insertion loss. Another current controls amplification based on the type of signal on the line, either power or Ethernet. The T connect circuit 1100 is a relatively simple design with low power consumption. Elimination of amplifiers improves stability but may affect accuracy of insertion loss control.

Figure 12:
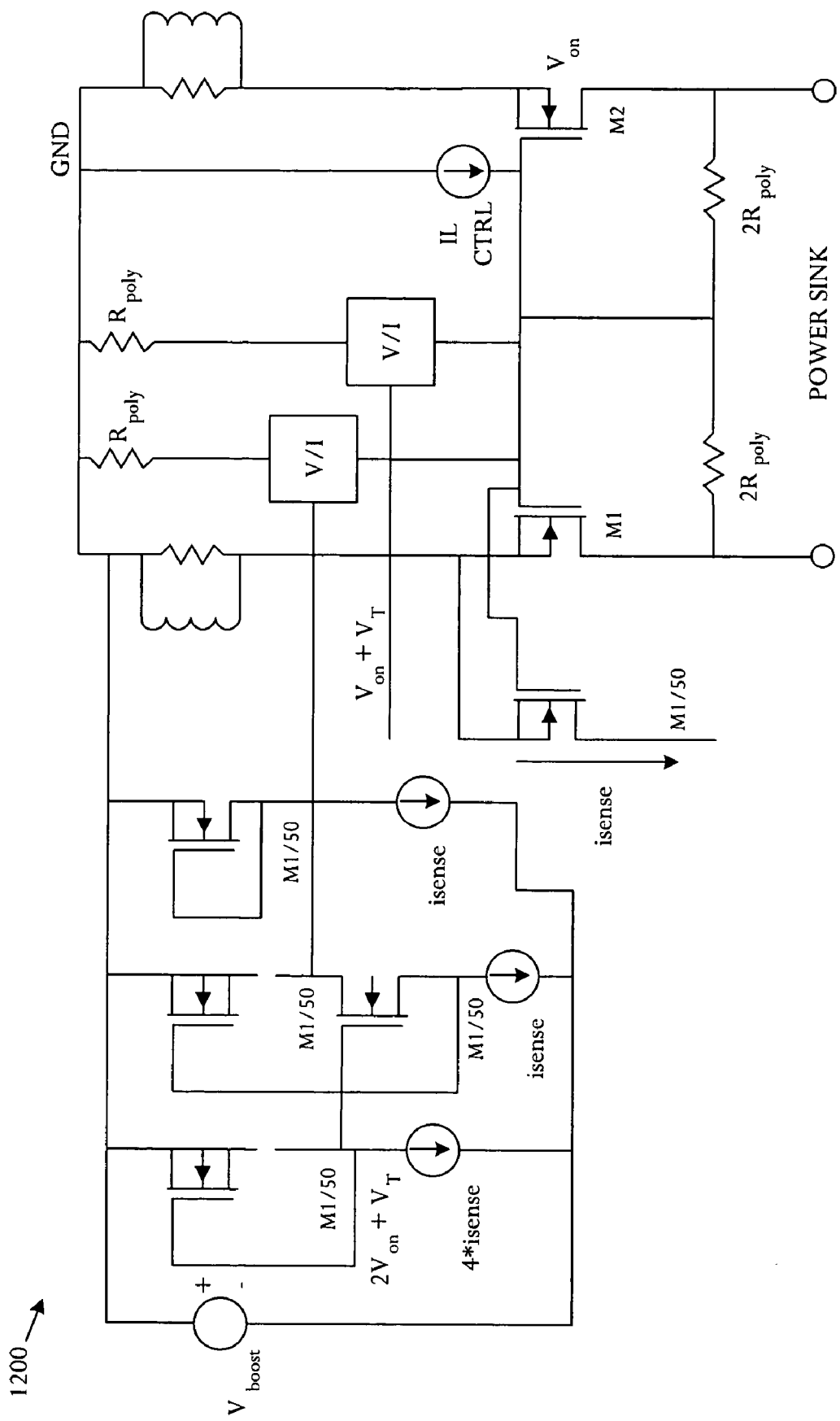
FIG. 12 is a schematic circuit diagram depicting an embodiment of a T connect circuit that is adapted for insertion loss control.

Referring to FIG. 12, a schematic circuit diagram depicts an embodiment of a T connect circuit 1200 that is adapted for insertion loss control. A $V_T$ generator is formed by taking the current difference between $V_{on}+V_T$ and a $V_{on}$ circuit. An Ethernet insertion loss control signal is a programmable current source based on a $V_{BG}/R_{poly}$ current, thereby enabling accurate voltage generation when the current is passed through a matching polysilicon resistor.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
   a power potential rectifier comprising a transistor bridge comprising a plurality of transistors with source and bulk connections tied to output voltage lines adapted to conductively couple a network connector to an integrated circuit that rectifies and passes a power signal and data signal received from the network connector, the power potential rectifier regulating a received power and/or data signal to ensure proper signal polarity is applied to the integrated circuit.

2. The network device according to claim 1 wherein:
   the power potential rectifier is configured to couple directly to lines of the network connector and regulate the power signal whereby the power potential rectifier passes the data signal with substantially no degradation.

3. The network device according to claim 1 wherein:
   the network connector receives a plurality of twisted pair conductors; and
   any one of a subset of the twisted pair conductors can forward bias to deliver current and the power potential rectifier can forward bias a return current path via a remaining conductor of the subset.

4. The network device according to claim 1 further comprising:
   at least one transformer coupled across line pairs of the network connector comprising a coil and a center tap coupled to the coil, the center tapping configured to separate the power signal from the data signal; and
   the power potential rectifier coupled to the center tap of the at least one transformer and configured to regulate the power signal.

5. The network device according to claim 1 further comprising:
   the transistor bridge integrated onto the integrated circuit that rectifies and passes a power signal and data signal received from the network connector.

6. The network device according to claim 5 wherein:
the transistor bridge couples directly to lines of the network connector and regulates the power signal whereby the transistor bridge passes the data signal with substantially no degradation.

7. The network device according to claim 5 further comprising:
the transistor bridge transistors being selected from a group consisting of metal oxide semiconductor (MOS) transistors, junction field effect transistors (JFET), switchable devices, and impedance control devices.

8. The network device according to claim 1 further comprising:
a metal oxide semiconductor (MOS) bridge integrated unto the integrated circuit that rectifies and passes a power signal and data signal received from the network connector.

9. The network device according to claim 8 further comprising:
at least one transformer coupled across line pairs of the network connector comprising a coil and a center tap coupled to the coil, the center tapping configured to separate the power signal from the data signal; and
the MOS bridge coupled to the center tap of the at least one transformer and configured to regulate the power signal.

10. The network device according to claim 8 further comprising:
the metal oxide semiconductor (MOS) bridge comprising N-channel metal oxide semiconductor (NMOS) transistors and P-channel metal oxide semiconductor (PMOS) transistors connected in a bridge configuration that emulates a diode bridge whereby pairs of NMOS transistors replace diodes that connect to ground and pairs of PMOS transistors replace diodes that connect to a power line.

11. The network device according to claim 1 further comprising:
a T connect element and an Ethernet physical layer (PHY) module integrated into the integrated circuit, the T connect element being adapted to enable ground potential of the Ethernet PHY module to float relative to earth ground; and
a metal oxide semiconductor (MOS) bridge integrated onto the integrated circuit and coupled to the T connect element.

12. The network device according to claim 1 further comprising:
the transistor bridge integrated onto the integrated circuit, the transistor bridge comprising transistors configured to enable relatively large drain-source voltage $V_{ds}$ and relatively small gate-source voltage $V_{gs}$.

13. The network device according to claim 12 further comprising:
the transistor bridge comprising a plurality of lateral double-diffused metal oxide semiconductor (LDMOS) transistors configured to enable relatively large drain-source voltage $V_{ds}$ and relatively small gate-source voltage $V_{gs}$.

14. The network device according to claim 12 further comprising:
the transistor bridge comprising a plurality of metal oxide semiconductor field-effect transistors (MOSFETs), the individual MOSFETS coupled to a limiter configured to maintain an essentially constant gate-source voltage $V_{gs}$ across the MOSFET at approximately a process limit whereby resistance is minimized or reduced.

15. The network device according to claim 12 further comprising:
the transistor bridge comprising a plurality of metal oxide semiconductor field-effect transistors (MOSFETs), the individual MOSFETs coupled to a limit and disable circuit configured to maintain an essentially constant gate-source voltage $V_{gs}$ across the MOSFET at approximately a process limit whereby resistance is minimized or reduced, and to disable transistor bridge devices on opposing power lines whereby gates of a MOSFET bridge are turned off for lines that are not powered.

16. The network device according to claim 1 further comprising:
a T connect element and an Ethernet physical layer (PHY) module integrated into the integrated circuit, the T connect element adapted to enable ground potential of the Ethernet PHY module to float relative to earth ground; and
the power potential rectifier integrated onto the integrated circuit and coupling individual lines of the network connector into T connect elements.

17. A network communication apparatus comprising:
a transistor bridge comprising a plurality of transistors with source and bulk connections tied to output voltage lines configured for integration into an integrated circuit and adapted to regulate a power and/or data signal to ensure proper signal polarity is applied to the integrated circuit.

18. The apparatus according to claim 16 further comprising:
the transistor bridge transistors being selected from a group consisting of metal oxide semiconductor (MOS) transistors, junction field effect transistors (JFET), switchable devices, and impedance control devices.

19. The apparatus according to claim 16 wherein:
the transistor bridge couples directly to lines of a network connector and regulates the power signal whereby the transistor bridge passes the data signal with substantially no degradation.

20. A network communication apparatus comprising:
a metal oxide semiconductor (MOS) bridge comprising a plurality of metal oxide semiconductor field effect transistors (MOSFET)s with source and bulk connections tied to output voltage lines configured for integration into an integrated circuit and adapted to regulate a power and/or data signal to ensure proper signal polarity is applied to the integrated circuit.

21. The apparatus according to claim 19 further comprising:
the metal oxide semiconductor (MOS) bridge comprising N-channel metal oxide semiconductor (NMOS) transistors and P-channel metal oxide semiconductor (PMOS) transistors connected in a bridge configuration that emulates a diode bridge whereby pairs of NMOS transistors replace diodes that connect to ground and pairs of PMOS transistors replace diodes that conned to a power line.

22. The apparatus according to claim 19 further comprising:
a T connect element and an Ethernet physical layer (PHY) module integrated into the integrated circuit, the T connect element adapted to enable ground potential of the Ethernet PHY module to float relative to earth ground; and
a metal oxide semiconductor (MOS) bridge integrated onto the integrated circuit and coupled to the T connect element.

23. The apparatus according to claim 19 further comprising:
at least one transformer coupled across line pairs of a network connector comprising a coil and a center tap coupled to the coil, the center tapping configured to separate the power signal from the data signal; and
the MOS bridge coupled to the center tap of the at least one transformer and configured to regulate the power signal.

* * * * *